United States Patent

[11] 3,540,592

| [72] | Inventors | Antoine Derreumaux<br>18, Rue d'Arminonville 92, Neuilly sur Seine;<br>Marc Lambert, Paris, France |
|---|---|---|
| [21] | Appl. No. | 786,900 |
| [22] | Filed | Dec. 26, 1968 |
| [45] | Patented | Nov. 17, 1970 |
| [73] | Assignee | Said Lambert assignor to said Derreumaux |
| [32] | Priority | Dec. 29, 1967 |
| [33] | | France |
| [31] | | No. 134336 |

[54] CLOSED-CIRCUIT SYSTEM FOR THE TREATMENT OF THE WATERS OF A SWIMMING POOL
1 Claim, 3 Drawing Figs.

| [52] | U.S. Cl. | 210/169 |
|---|---|---|
| [51] | Int. Cl. | E04h 3/20 |
| [50] | Field of Search | 210/169 |

[56] References Cited
UNITED STATES PATENTS

| 2,162,074 | 6/1969 | Everson | 210/169 |
|---|---|---|---|
| 3,365,064 | 1/1968 | Horan | 210/169 |
| FOREIGN PATENTS | | | |
| 950,482 | 2/1964 | Great Britain | 210/169 |

Primary Examiner—Reuben Friedman
Assistant Examiner—T. A. Granger
Attorney—J. Delattre Seguy ABSTRACT: Closed-circuit system for treating water of a swimming pool or the like. A first portion of said circuit includes a water sterilizer and a second portion of said circuit is connected to said first circuit portion upstream of the sterilizer. A water filter is disposed in the second circuit portion. Valve means regulate the proportion of water which flows through the second circuit portion.

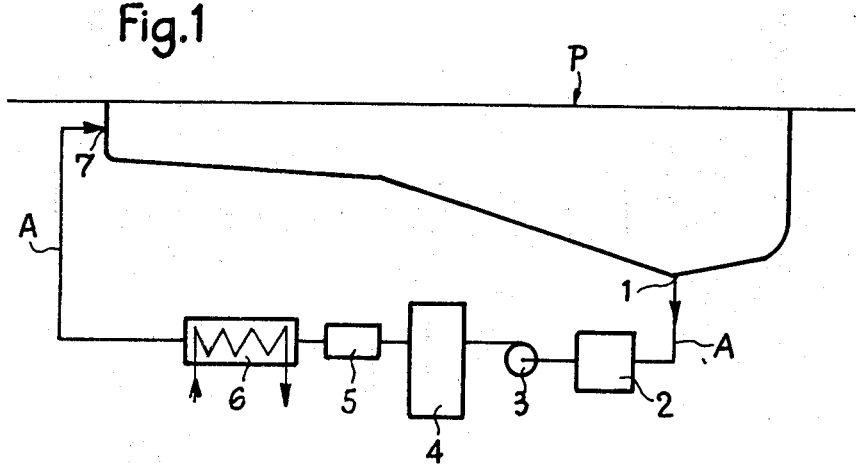
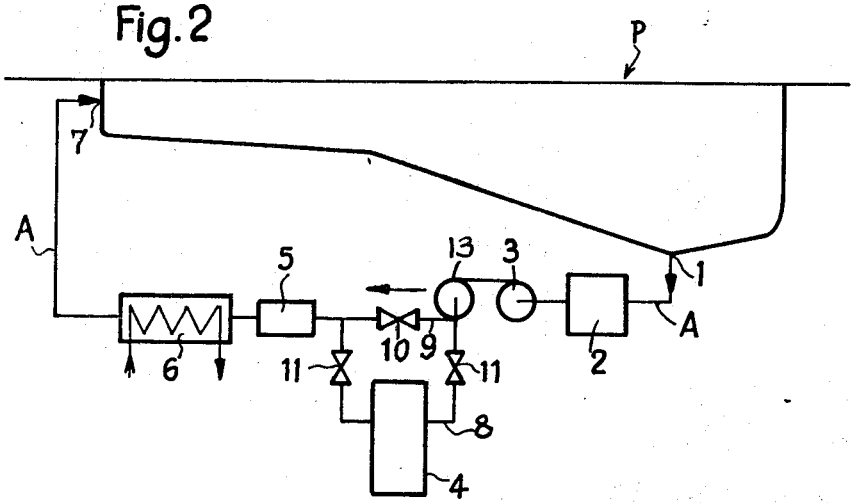
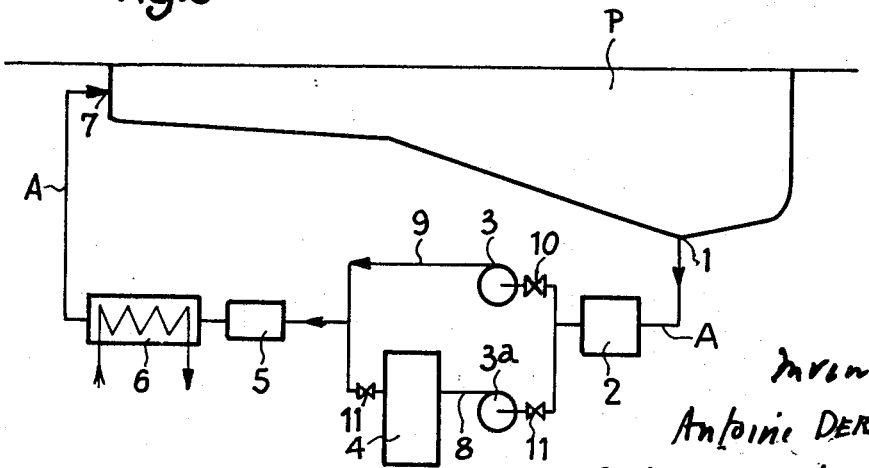

CLOSED-CIRCUIT SYSTEM FOR THE TREATMENT OF THE WATERS OF A SWIMMING POOL

This invention relates to the treatment of water, and, more particularly, to a system for the treatment, in closed circuit, of the water of swimming pools or the like, by separate operations of filtration and sterilization of the water.

In such a closed-circuit system, the water is pumped out of the pool and back into the pool under pressure after having been subjected to the regenerating treatment comprising effecting on the whole of the water flowing in the closed circuit successively a filtration and then a sterilization which latter is effected either chemically (addition of a bactericide) or physically (for example by ultraviolet rays or electrolysis). The treatment of sterilization must give to the water a remanent sterilizing power throughout the pool.

To keep the water of a pool clean and sterile, the present tendency is to increase the flow of the water submitted to the treatment in order to regenerate the whole of the water of the pool in less than 4 hours and less than 1 hour for the children's pools. If the water is recycled too slowly, it rapidly loses its essential sanitary properties, particularly its limpidity and its sterilizing power.

However, this increase in the recycling flow results in inconveniences in conventional treating systems in which the filter and the sterilizing apparatus are disposed in series, if the whole of the recycled water is filtered.

Indeed, it is practically impossible to maintain a a constant recycling flow after the sterilization because of the clogging of the filters. Further, the filtration of the entire volume of the accelerated flow of water requires important investments.

According to this invention, the process of treating the water of a pool by a separate filtration step and a sterilization step in a closed-circuit system is characterized in that only a part of the water flowing through the system is filtered. The circuit for filtration is either completely separated from that relating to the sterilization, or connected in parallel to the sterilization circuit, the sterilization being effected, according to the process, always with constant flow.

According to another feature of the invention, at the outlet of a pump in the closed circuit the waters can be piped to a cyclone separator in order to separate the suspended matters and to pipe them to the filtration circuit.

The foregoing features result for example in the following advantages:
  they allow a flow of water in the closed circuit which is both high and constant;
  they considerably reduce the work of the filters by avoiding any biological deterioration of the impurities to eliminate (e.g., water-weeds, human organic waste);
  they maintain a reduced, but efficient, rate of constant sterilization in all parts of the pool; and
  they permit a cheaper modernization of the pools equipped with old installations.

Thus the volume of water recycled per hour after sterilization will be between three times and one-tenth of the volume of the pool, while the hourly filtrated volume will be between twice and one-twelfth of the pool's volume.

Other characteristics and advantages of the invention will appear from the following description.

In the annexed drawing, given only as an example:
FIG. 1 shows diagrammatically a conventional closed-circuit system for the treatment of the water of a pool;
FIG. 2 shows diagrammatically a system according to the invention; and
FIG. 3 shows diagrammatically a modification of a system according to the invention.

In FIG. 1, connected to a pool P is a conduit A of a closed-circuit system which extends from the pool outlet 1 successively through a prefilter 2, a pump 3, a filter 4, a sterilization apparatus 5 and a reheater 6, the filtered and sterilized water returning to the pool at inlet 7.

In FIG. 2, which shows a system according to the invention, the filter 4, instead of being connected in series in the conduit A as in FIG. 1, is connected to a conduit 8 coming from an outlet of the dirty waters of a cyclone separator 13. The inlet of the latter is connected to the outlet of a pump 3, and a clean water outlet of the separator 13 is connected by conduit 9 to the sterilizer or sterilization apparatus 5. It will be seen that the outlet of the filter is connected to the pipe 9 in a region upstream of the sterilizer 5 with respect to the direction of flow of the water. Valves 10 and 11, provided respectively on conduits 9 and 8, permit a regulation of the proportions of the total volume of water which flow through the two conduits 9, 8 and consequently a regulation of the fraction of the total volume of water flowing through the closed-circuit system which is subjected to a filtration. A pump may be inserted in the conduit 8 to constitute an accelerator which serves to compensate for loss of pressure due to the clogging of the filter.

Thus in the closed-circuit system according to the invention just described, the circuit comprising the conduit A and the sterilizer 5 may be termed a first circuit portion and the circuit comprising the conduit 8 and the filter 4 a second circuit portion connected in parallel with the first circuit portion.

In FIG. 3, the closed-circuit system includes, in addition to a pump 3 in conduit 9, in which a part of the water in the closed-circuit system is not filtered, another pump 3a located in the conduit 8 leading to the filter 4 of the second circuit portion.

According to the climate of the region and the number and cleanness of the bathers, the total volume of the pool will be recycled and sterilized within a length of time between 8 hours and 20 minutes. The hourly filtered volume varies as a function of the same factors, or perhaps differently, from one-twelfth to twice the volume of the pool.

A few more precise examples will now be given.

EXAMPLE 1

Public closed pool offering 400-$m^2$ water surface with considerable attendance.
Volume of the pool 700-$m^3$.
Daily average attendance from 8:a.m. to midnight: 1,200 to 1,500 people.
Recycling and sterilization with constant flow in from 1 to 2 hours with filtration in 2 or 3 hours, according to the cleanness of the users.
Flow of recycling 500 $m^3$ per hour.
Flow of filtration 250 $m^3$ per hour.

EXAMPLE 2

Open air public pool, volume 1,800 $m^3$, frequented daily by 1,000 to 4,000 bathers, according to the climatic conditions.
Recycling and sterilization with constant flow during a time varying from 90 minutes to 2 hours, depending on the cleanness of the bathers and their consumption of beauty products.
Flow of recycling of 900 $m^3$ per hour.
Flow of filtration 300 $m^3$ per hour.

EXAMPLE 3

Open air public pool of 810 $m^3$ presenting 350 $m^2$ of water surface, frequented daily by 100 to 300 bathers.
Constant flow recycling of the 810 $m^3$ in 3 hours (270 $m^3$ per hour) and filtration at 175 $m^3$ per hour (that is to say in less than 5 hours).

EXAMPLE 4

Private open air pool, water surface of 120 $m^2$, containing 200 $m^3$ of water.
Recycling and regeneration in 2 hours (100 $m^3$ per hour) and filtration in 10 hours (20 $m^3$ per hour).

We claim:
1. A closed-circuit system for treating recirculated water of a swimming pool or the like having an inlet and an outlet, comprising a first circuit portion having one end connected to said inlet and another end connected to said outlet, a water sterilizer in said first circuit portion, a second circuit portion connected in parallel to said first circuit portion and having one end connected to said first circuit portion upstream of said sterilizer, a water filter in said second circuit portion, valve means in said second circuit portion between said one end thereof and said filter for controlling the rate of flow through said filter, a pump in said closed-circuit system upstream of said filter, whereby it is possible to control in the operation of the system the proportion of recirculated water flowing from said outlet to said inlet which flows through said filter and the proportion of recirculated water which flows to said sterilizer in bypassing said filter and a cyclone separator having an inlet, a clean water outlet and a dirty water outlet, said clean water outlet of said separator being connected to said first circuit portion, said dirty water outlet of said separator being connected to said end of said second circuit portion and said inlet of said separator, communicating with said outlet of said pool, being connected to the first circuit portion upstream of said one end of said second circuit portion.